US009628301B2

United States Patent
Guo

(10) Patent No.: US 9,628,301 B2
(45) Date of Patent: Apr. 18, 2017

(54) INTERFERENCE ESTIMATION FOR LTE RECEIVER

(71) Applicant: TEXAS INSTRUMENTS INCORPORATED, Dallas, TX (US)

(72) Inventor: Li Guo, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 156 days.

(21) Appl. No.: 14/339,214

(22) Filed: Jul. 23, 2014

(65) Prior Publication Data

US 2016/0028558 A1   Jan. 28, 2016

(51) Int. Cl.
*H04J 11/00* (2006.01)
*H04L 25/02* (2006.01)
*H04L 25/03* (2006.01)

(52) U.S. Cl.
CPC .......... *H04L 25/021* (2013.01); *H04L 25/022* (2013.01); *H04L 25/0212* (2013.01); *H04L 25/03* (2013.01); *H04L 25/03114* (2013.01); *H04L 25/03968* (2013.01); *H04L 2025/03426* (2013.01)

(58) Field of Classification Search
CPC .... H04B 17/345; H04B 7/0854; H04L 25/021
See application file for complete search history.

(56) References Cited

U.S. PATENT DOCUMENTS

| 8,473,540 B1* | 6/2013 | Rao | G06F 17/16 708/201 |
|---|---|---|---|
| 2006/0008037 A1* | 1/2006 | Chang | H04L 1/20 375/346 |
| 2007/0217495 A1* | 9/2007 | Han | H04B 17/336 375/227 |
| 2010/0046661 A1* | 2/2010 | Yoshida | H04B 1/71052 375/346 |
| 2011/0122789 A1* | 5/2011 | Haustein | H04L 5/0007 370/252 |
| 2014/0016689 A1 | 1/2014 | Dua et al. | |
| 2014/0064106 A1* | 3/2014 | Balraj | H04W 24/10 370/252 |
| 2014/0078922 A1 | 3/2014 | Xing | |

FOREIGN PATENT DOCUMENTS

| WO | 2006094037 | 8/2006 |
| WO | 2008027344 | 6/2008 |
| WO | 2008055179 | 8/2008 |

OTHER PUBLICATIONS

Kimura et al., "Inter-Cell Interference Coordination (ICIC) Technology," Fujitsu Sci. Tech. J., vol. 48, No. 1, pp. 89-94 (Jan. 2012).

* cited by examiner

*Primary Examiner* — Kevin C Harper
(74) *Attorney, Agent, or Firm* — Ronald O. Neerings; Charles A. Brill; Frank D. Cimino

(57) ABSTRACT

A method of estimating interference in a received signal is disclosed. The method includes receiving a plurality of subcarriers from a remote transmitter. Each of the subcarriers is multiplied by a control signal. At least two of the subcarriers are compared to produce a differential signal. Interference is estimated in response to the differential signal.

15 Claims, 4 Drawing Sheets

INTERFERENCE ESTIMATION FOR LTE RECEIVER

BACKGROUND OF THE INVENTION

The present embodiments relate to wireless communication systems and, more particularly, to a method and apparatus for interference estimation in a Long Term Evolution (LTE) wireless receiver.

Conventional cellular communication systems operate in a point-to-point single-cell transmission fashion where a user terminal or equipment (UE) is uniquely connected to and served by a single cellular base station (eNB or eNodeB) at a given time. An example of such a system is the 3GPP Long Term Evolution (LTE Release-8). Advanced cellular systems are intended to further improve the data rate and performance by adopting multi-point-to-point or coordinated multi-point (CoMP) communication where multiple base stations can cooperatively design the downlink transmission to serve a UE at the same time. An example of such a system is the 3GPP LTE-Advanced system (Release-10 and beyond). This greatly improves received signal strength at the UE by transmitting the same signal to each UE from different base stations. This is particularly beneficial for cell edge UEs that observe strong interference from neighboring base stations.

FIG. 1 shows an exemplary wireless telecommunications network having cells A and B. The illustrative telecommunications network includes base stations 100 in cell A and 110 in cell B, though in operation, a telecommunications network necessarily includes many more base stations. Base station 100 is synchronized with UEs 102 and 106 and communicates over respective wireless channels 104 and 108. Likewise, base station 110 is synchronized with UE 112 and communicates over wireless channel 114. Because each UE is synchronized with its respective base station, intra-cell interference is not a significant problem. For example, UEs 102 and 106 do not significantly interfere with each other or with base station 100. Base stations 100 and 110, however, are not synchronized. Therefore, UE 112 is not synchronized with either UE 102 or 106. This lack of synchronization causes significant inter-cell interference for UEs near a cell boundary. For example, UE 106 primarily communicates with base station 100 over channel 108. Thus, uplink transmission from UE 106 to base station 100 produces significant inter-cell interference 116 at base station 110. Likewise, downlink transmission from base station 110 to UE 112 produces significant inter-cell interference 116 at UE 106.

Turning now to FIG. 2, there is a diagram of a subframe 200 having a Physical Resource Block (PRB) pair. The eNB may configure 1, 2, 4, or 8 PRB pairs for communication with the UE. However, each PRB pair is a replica, and only one PRB pair is shown for the purpose of explanation. Each column of the diagram of the subframe corresponds to 12 subcarriers or tones in an OFDM symbol. There are 14 OFDM symbols in the subframe with a normal cyclic prefix (CP). The 3 OFDM symbols on the left side of the subframe include resource elements (REs) for transmission of a legacy physical downlink control channel (PDCCH) and legacy cell-specific reference signals (CRS). These 3 OFDM symbols are necessary for backwards compatibility with previous wireless standards. The 11 OFDM symbols on the right include resource elements (REs) for transmission of an enhanced physical downlink control channel (EPDCCH), and demodulation reference signals (DMRS) or pilot signals, as well as cell-specific reference signals (CRS) and orphan or unused REs. Orphan REs may exist because the UE always assumes that 24 REs are reserved for DMRS transmission in a PRB pair configured for EPDCCH transmission.

A cause of inter-cell interference is that both base stations use the same subcarriers or tones for each PRB with reuse 1. This means that the base station assumes that all 12 subcarriers are available for each PRB and is especially problematic in areas of dense deployment. If only a portion of the subcarriers were allocated to each base station, inter-cell interference would be reduced at the expense of bandwidth and throughput. Several attempts to reduce inter-cell interference through inter-cell interference coordination (ICIC) technology have been developed. For example, Kimura et al., "Inter-Cell Interference Coordination (ICIC) Technology," Fujitsu Sci. Tech. J., Vol. 48, No. 1, pp. 89-94 (January 2012), have developed a method of fractional frequency reuse (FFR) to allocate different frequencies to UEs near a cell boundary. Others, such as Xing (U.S. Pub. No. 2014/0078922) employ a spreading code for adjacent cells to identify and remove interfering signals. Other methods rely on channel estimation as determined from known pilot signals. For example, Dua et al. (U.S. Pub. No. 2014/0016689) programs an equalizer by estimating a channel impulse response (CIR) and determining noise and power estimates based on the CIR. Equalizer inputs of a covariance matrix are adjusted based on these noise power estimates. A disadvantage of this method, however, is that errors in channel estimation are considered interference and noise. Moreover, in areas of dense deployment near cell boundaries, signal quality is degraded and channel estimation errors are significant.

While the preceding approaches provide steady improvements in wireless communications, the present inventor has recognized that still further improvements in interference detection are possible. Accordingly, the preferred embodiments described below are directed toward this as well as improving upon the prior art.

BRIEF SUMMARY OF THE INVENTION

In a preferred embodiment of the present invention, there is disclosed a method of estimating interference in a received signal. The method includes receiving a plurality of subcarriers from a remote transmitter. Each of the subcarriers is multiplied by a control signal. At least two of the subcarriers are compared to produce a differential signal. Interference is estimated in response to the differential signal.

DETAILED DESCRIPTION OF THE INVENTION

Inter-cell interference is a significant problem and a major source of performance degradation in both uplink and downlink LTE wireless communication systems. This problem is especially significant in cell areas with dense deployment. An accurate estimate of interference information is necessary to effectively suppress inter-cell interference.

Figure 3:
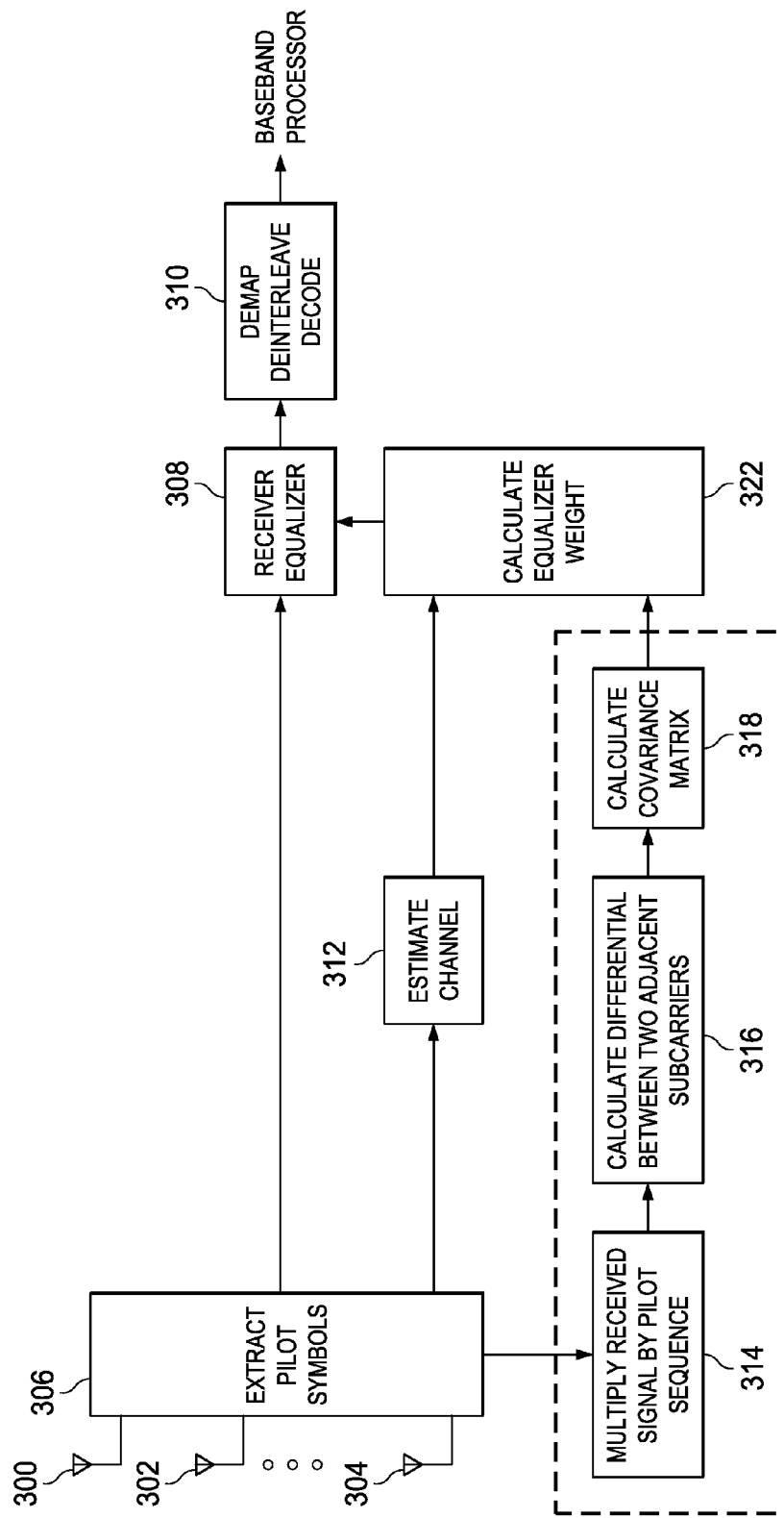
FIG. 3 is a block diagram of a wireless receiver of the present invention.

Referring to FIG. 3, there is a block diagram of a Long Term Evolution (LTE) diversity receiver of the present invention. The receiver includes receive antennas 300-304, however, receivers of the present invention may include as few as two receive antennas and as many as N receive antennas, where N is an integer. Circuit 306 is coupled to the receive antennas and extracts pilot signals from a received data stream as is known in the art. The data stream is then applied to receiver equalizer circuit 308. The equalized data stream is subsequently applied to circuit 310 for demapping, deinterleaving, and decoding. The decoded data stream is then applied to a baseband processor (not shown).

Figure 1:
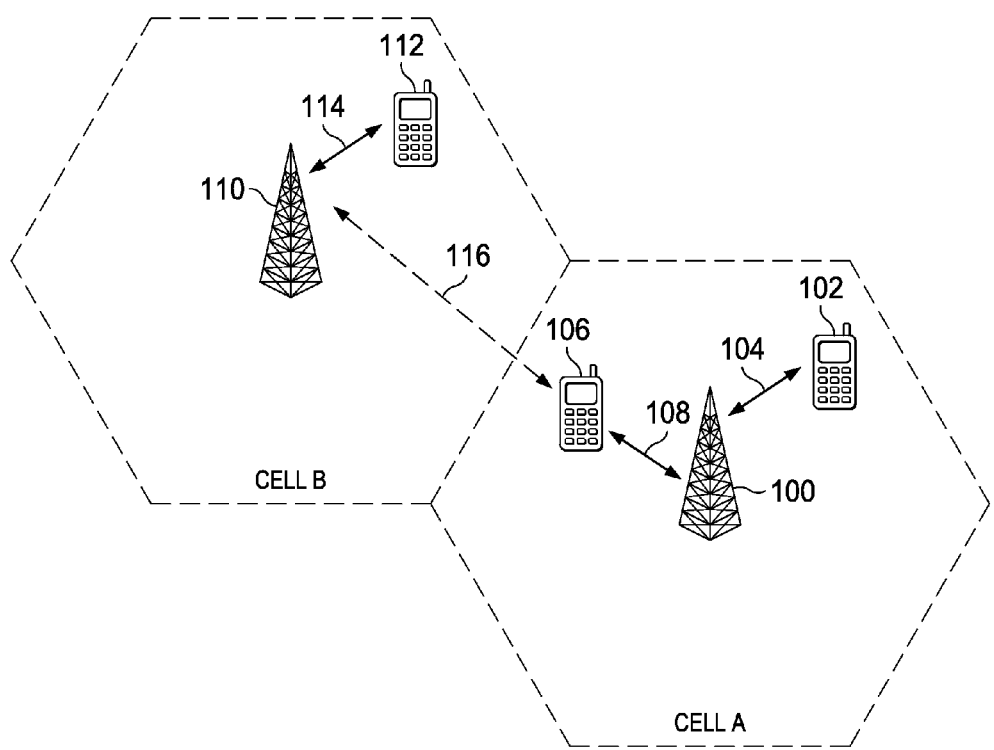
FIG. 1 is a diagram of a wireless communication system of the prior art.
Figure 2:
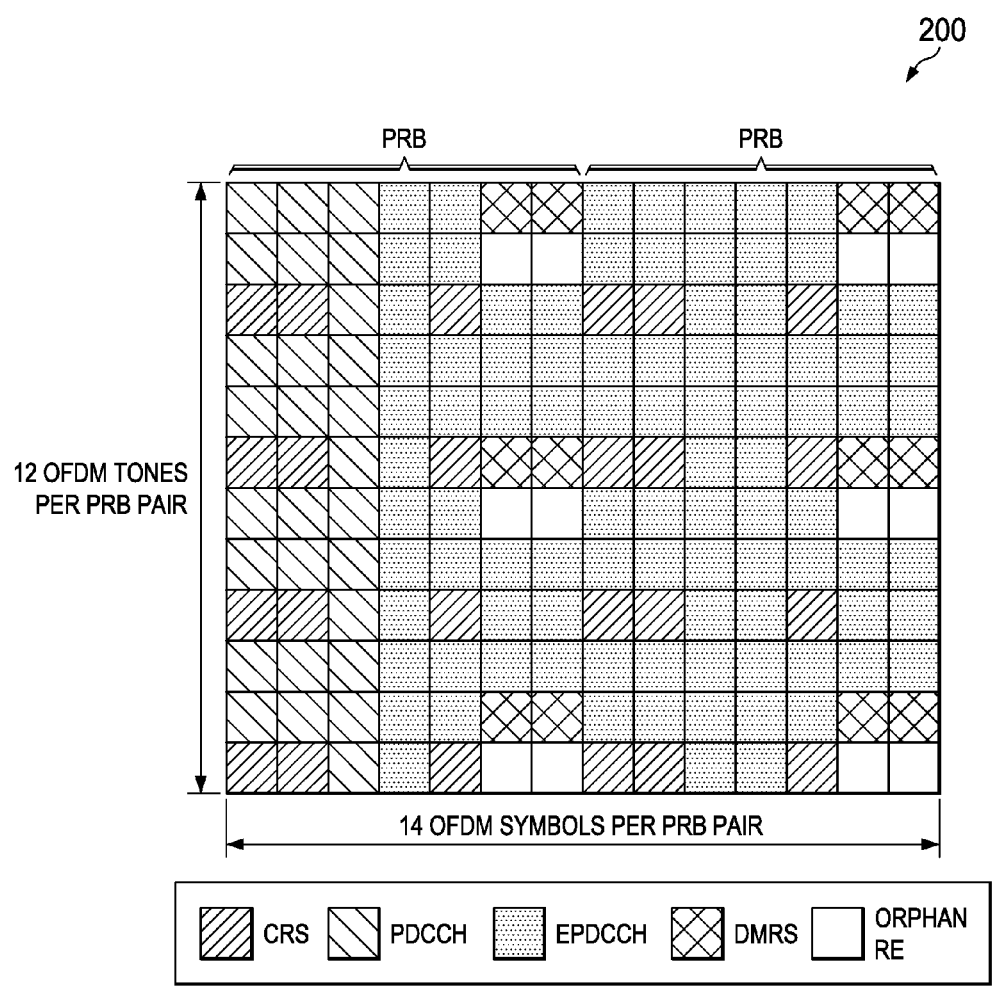
FIG. 2 is a diagram of a pair of Physical Resource Blocks of the prior art.

Extracted pilot signals are applied to circuit 312 to estimate the wireless channel. Circuit 312 is coupled to equalizer weight calculation circuit 322. The data stream and extracted pilot signals are also applied to circuit 320 according to the present invention. Circuit 320 may be realized in software, hardware, or a combination of hardware and software. The Long Term Evolution (LTE) data stream comprises a data frame as shown at FIG. 2. Circuit 320 includes multiplication circuit 314, differential circuit 316, and covariance matrix circuit 318. Circuit 320 is also coupled to equalizer weight calculation circuit 322.

Figure 4:
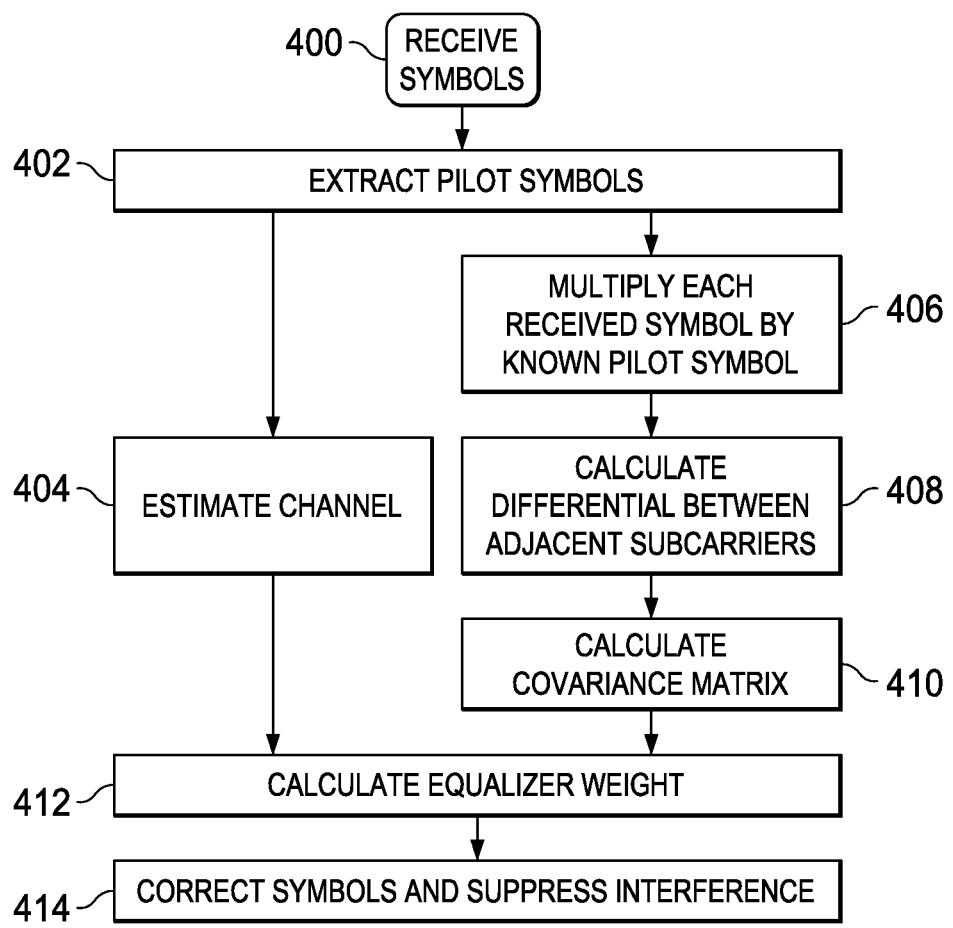
FIG. 4 is a flow diagram showing calculation of equalizer weights based on a differential between adjacent subcarriers.

Turning now to FIG. 4, there is a flow diagram that will be used to explain operation of the receiver of FIG. 3. A data stream of symbols is initially received by N receive antennas 300-304 at step 400. The LTE data stream for N receive antennas is given by equation [1].

$$\vec{y} = \begin{bmatrix} y_1 \\ y_2 \\ \vdots \\ y_N \end{bmatrix} = \vec{H} \times s + \vec{I} + \vec{v} = \begin{bmatrix} H_1 \\ H_2 \\ \vdots \\ H_N \end{bmatrix} \times s + \begin{bmatrix} I_1 \\ I_2 \\ \vdots \\ I_N \end{bmatrix} + \begin{bmatrix} v_1 \\ v_2 \\ \vdots \\ v_N \end{bmatrix} \quad [1]$$

Here, vector $\vec{y}$ is the received data or pilot signal from all N receive antennas, s is the transmitted signal or data stream, H is the channel between a remote transmitter and each respective receive antenna, and $\vec{I}$ are respective interference and noise components associated with each channel. At step 402 the pilot signals are extracted from the data stream by circuit 306. The pilot signals are applied to circuit 312 at step 404 to estimate the wireless channel between a remote transmitter and the N receive antennas. The channel estimate is then applied to equalizer weight calculation circuit 322.

At step 406, each subcarrier from the multiple receive antennas of the received signal is multiplied by a corresponding control signal or known pilot signal s* by circuit 314. The products are stored in vector $\vec{z}_n$ as in equation [2], where n is the index of each subcarrier.

$$\vec{z}_n = \vec{y}_n \times s_n^* \quad [2]$$

Circuit 316 calculates a differential $\vec{q}_n$ between any two adjacent subcarriers n and n+1 at step 408 as in equation [3].

$$\vec{q}_n = \vec{z}_n - \vec{z}_{n+1} \quad [3]$$

At step 410, circuit 318 calculates a covariance matrix R of interference for each subcarrier group as in equation [4]. Here, $n_0$ and $n_1$ are preferably lower and upper indices of a column of subcarriers of the data frame of FIG. 2, and H denotes a Hermitian transpose.

$$R = \sum_{n=n_0}^{n_1} \vec{q}_n \times \vec{q}_n^H \quad [4]$$

At step 412, the channel estimate from step 404 and the covariance matrix R from step 410 are applied to equalizer weight circuit 322. Equalizer weights W for the data stream are calculated by weight circuit 322 in response to the channel estimate and covariance matrix R. These weights are applied to receiver equalizer circuit 308 at step 414 to correct received data symbols and suppress interference in the received signal. In general, covariance matrix R can be used in any equalizer weight calculation method to suppress interference energy in the received signal. In a preferred embodiment of the present invention, the channel estimate $\hat{H}$ from circuit 312 is used together with covariance matrix R in a linear minimum mean squared error (LMMSE) method according to equation [5] to produce equalizer weights W.

$$W = \hat{H}^H (\hat{H}\hat{H}^H + R)^{-1} \quad [5]$$

The corrected data symbols less interference are then applied to circuit 310 for demapping, deinterleaving, and decoding. The decoded symbols are then applied to a baseband processor.

There are several advantages of the present invention over interference suppression methods of the prior art. First, interference suppression of the present invention does not depend on the channel estimate. Thus, errors in the channel estimate do not negatively impact interference suppression. This is especially important in high density areas where signal quality is degraded. Second, the present invention advantageously employs the LTE wireless characteristic that there is little difference in channels for adjacent or closely spaced subcarriers. Thus, a difference in signals on adjacent subcarriers is primarily due to interference. Third, adjacent LTE subcarriers are typically separated by 15 KHz or 7.5 KHz. This is much less than the coherence bandwidth of the channels. For example, the coherence bandwidth for 0.9 correlation for the extended pedestrian A specification is approximately 460 Hz and for the extended vehicular A specification is approximately 60 Hz. Consequently, it is not strictly necessary to compare signals on adjacent subcarriers as long as the subcarriers are closely spaced. Moreover, multiple comparisons such as with upper and lower adjacent subcarriers are possible for confirmation of the covariance matrix.

Still further, while numerous examples have thus been provided, one skilled in the art should recognize that various modifications, substitutions, or alterations may be made to the described embodiments while still falling with the inventive scope as defined by the following claims. Other combinations will be readily apparent to one of ordinary skill in the art having access to the instant specification.

What is claimed is:

1. A method of suppressing interference in a received signal, comprising:
   receiving a plurality of subcarriers from a remote transmitter circuit by a receive antenna circuit;
   comparing at least two of the subcarriers to produce a plurality of differential signals;
   multiplying each differential signal by its Hermitian transpose to produce a plurality of products;

adding the plurality of products to produce a sum of products in a covariance matrix;
estimating the interference in response to the covariance matrix; and
suppressing the interference in response to the step of estimating.

2. A method as in claim 1, wherein the at least two subcarriers are adjacent.

3. A method as in claim 1, comprising multiplying the plurality of subcarriers by a control signal.

4. A method as in claim 3, wherein the control signal is a pilot signal.

5. A method as in claim 3, wherein the control signal is a demodulation reference signal.

6. A method as in claim 1, comprising equalizing the received signal in response to the covariance matrix.

7. An interference suppression circuit, comprising:
an input circuit arranged to receive a data stream comprising a plurality of subcarriers and to extract at least one control signal;
an estimate circuit arranged to calculate a channel estimate in response to the at least one control signal;
a differential circuit arranged to compare at least two of the subcarriers to produce a differential signal;
a matrix circuit arranged to calculate a covariance matrix in response to the differential signal;
a weight calculation circuit arranged to calculate interference suppression weights in response to the covariance matrix and the channel estimate; and
an equalizer circuit arranged to suppress interference in the received data stream in response to the interference suppression weights.

8. A circuit as in claim 7, wherein the at least one control signal is a pilot signal.

9. A circuit as in claim 7, wherein the at least one control signal is a demodulation reference signal.

10. A circuit as in claim 7, comprising a multiplication circuit arranged to multiply each of the plurality of subcarriers by a respective control signal.

11. A method of suppressing interference in a wireless receiver circuit, comprising:
receiving a data stream comprising a plurality of subcarriers from a remote transmitter circuit;
extracting a plurality of control signals from the data stream with an extraction circuit;
multiplying each of the plurality of subcarriers by a respective control signal to produce a plurality of products;
comparing at least two of the products to produce a plurality of differential signals;
producing a sum of products in a covariance matrix in response to the plurality of differential signals;
calculating equalizer weights in response to the covariance matrix; and
suppressing the interference in response to the equalizer weights.

12. A method as in claim 11, wherein at least two subcarriers of the plurality of subcarriers are adjacent.

13. A method as in claim 11, wherein the control signal is one of a pilot signal and a demodulation reference signal.

14. A method as in claim 11, comprising equalizing the data stream in response to the covariance matrix.

15. A method as in claim 11, comprising:
estimating a channel in response to the plurality of control signals; and
equalizing the data stream by in response to the channel estimate and the covariance matrix.

* * * * *